United States Patent
Jun

(10) Patent No.: US 9,458,056 B2
(45) Date of Patent: Oct. 4, 2016

(54) LOW-EMISSIVITY TRANSPARENT LAMINATE, METHOD FOR MANUFACTURING SAID LOW-EMISSIVITY TRANSPARENT LAMINATE AND CONSTRUCTION MATERIAL INCLUDING THE SAME

(71) Applicant: LG Hausys, Ltd., Seoul (KR)

(72) Inventor: Youn-Ki Jun, Gwacheon-si (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 14/406,325

(22) PCT Filed: Dec. 27, 2012

(86) PCT No.: PCT/KR2012/011568
§ 371 (c)(1),
(2) Date: Dec. 8, 2014

(87) PCT Pub. No.: WO2013/191346
PCT Pub. Date: Dec. 27, 2013

(65) Prior Publication Data
US 2015/0158763 A1 Jun. 11, 2015

(30) Foreign Application Priority Data
Jun. 19, 2012 (KR) .......... 10-2012-0065544

(51) Int. Cl.
*B32B 15/04* (2006.01)
*B32B 17/06* (2006.01)
*C03C 17/36* (2006.01)

(52) U.S. Cl.
CPC ............. *C03C 17/366* (2013.01); *C03C 17/36* (2013.01); *C03C 17/3618* (2013.01); *C03C 17/3636* (2013.01); *C03C 17/3644* (2013.01); *C03C 17/3655* (2013.01); *C03C 17/3681* (2013.01);
(Continued)

(58) Field of Classification Search
USPC ....... 428/426, 428, 432, 434, 688, 689, 697, 428/699, 701, 702
See application file for complete search history.

(56) References Cited

U.S. PATENT DOCUMENTS

2005/0123772 A1  6/2005 Coustet et al.
2007/0281171 A1* 12/2007 Coster ............... B32B 17/10036
                                                    428/432
(Continued)

FOREIGN PATENT DOCUMENTS

DE  102008007981 A1  8/2009
EP       1230189 A1  8/2002
(Continued)

OTHER PUBLICATIONS

International Search Report for PCT/KR2012/011568 mailed Apr. 5, 2013.
(Continued)

*Primary Examiner* — Lauren R Colgan
(74) *Attorney, Agent, or Firm* — Hauptman Ham, LLP

(57) ABSTRACT

Provided are a low-emissivity transparent laminate having a multilayer structure that includes a base material and a coating layer, wherein the coating layer has a low-emissivity and electrically conductive layer, a dielectric layer, and an optical absorption metal layer in order starting from the base material, and a method for manufacturing the low-emissivity transparent laminate and a construction material including the same.

9 Claims, 3 Drawing Sheets

(52) U.S. Cl.
CPC ..... *C03C 17/3697* (2013.01); *C03C 2218/156* (2013.01); *Y10T 428/265* (2015.01); *Y10T 428/31678* (2015.04)

(56) References Cited

U.S. PATENT DOCUMENTS

| | | | | |
|---|---|---|---|---|
| 2009/0136765 | A1* | 5/2009 | Maschwitz | B32B 17/10036 428/432 |
| 2010/0062245 | A1* | 3/2010 | Martin | B32B 17/10174 428/336 |
| 2011/0261442 | A1* | 10/2011 | Knoll et al. | 359/360 |
| 2013/0057951 | A1* | 3/2013 | Hevesi et al. | 359/359 |

FOREIGN PATENT DOCUMENTS

| | | |
|---|---|---|
| JP | 2009514769 A | 4/2009 |
| KR | 20030061843 A | 7/2003 |
| KR | 20080015002 A | 2/2008 |
| KR | 20100098199 A | 9/2010 |
| WO | 2009067263 A1 | 5/2009 |
| WO | WO2011147864 * | 12/2011 |

OTHER PUBLICATIONS

European Search Report dated Jul. 8, 2015 in connection with the counterpart European Patent Application No. 12879351.0.

* cited by examiner

LOW-EMISSIVITY TRANSPARENT LAMINATE, METHOD FOR MANUFACTURING SAID LOW-EMISSIVITY TRANSPARENT LAMINATE AND CONSTRUCTION MATERIAL INCLUDING THE SAME

CROSS REFERENCE TO RELATED APPLICATION

This application claims the priority of Korean Patent Application No. 10-2012-0065544 filed on Jun. 19, 2012 in the Korean Patent and Trademark Office. Further, this application is the National Phase application of International Application No. PCT/KR2012/011568 filed on Dec. 27, 2012, which is incorporated herein by reference in its entirety.

TECHNICAL FIELD

The present invention relates to a low-emissivity transparent laminate, a building material and a method for manufacturing a low-emissivity transparent laminate.

BACKGROUND ART

Low-emissivity glass is glass on which a low-emissivity layer including a metal such as silver (Ag) having high reflectance in an infrared range is deposited as a thin film. The low-emissivity glass is a functional material providing energy saving effects by reflecting solar radiation in summer while preserving infrared rays generated from an indoor heater in winter.

Typical dielectric layers are composed of metal oxides, and include oxides of zinc (Zn), titanium (Ti), tin (Sn) and the like, composite metals of zinc and tin (SnZn), and the like. However, since the metal oxides composing the existing dielectric layers are likely to cause interface reaction between an oxide and a metal layer adjacent thereto after heat treatment, there is a drawback in that visible light transmittance of the metal oxides is prone to vary before and after heat treatment.

DISCLOSURE

Technical Problem

It is an aspect of the present invention to provide a low-emissivity transparent laminate which simultaneously realizes good visibility and privacy protection due to high visible light reflectance of an outer surface thereof and low visible light reflectance of an inner surface thereof while securing thermal insulation properties.

It is another aspect of the present invention to provide a building material including the above low-emissivity transparent laminate.

It is a further aspect of the present invention to provide a method for manufacturing the above low-emissivity transparent laminate.

Technical Solution

In accordance with one aspect of the present invention, a low-emissivity transparent laminate includes a substrate and a coating layer, wherein the coating layer has a multilayer structure including a low-emissivity electroconductive layer, a dielectric layer and a light absorption metal layer in a sequential order from the substrate in an upward direction.

The low-emissivity transparent laminate may have a difference in visible light reflectance from about 30% to about 75% between one surface thereof at a substrate side and the other surface thereof at a light absorption metal layer side.

The low-emissivity electroconductive layer may have an emissivity of about 0.01 to about 0.3.

The low-emissivity electroconductive layer may include a metal having a sheet resistance of about 0.78 Ω/sq to about 6.42 Ω/sq.

The low-emissivity electroconductive layer may include at least one selected from the group consisting of Ag, Au, Cu, Al, Pt, ion-doped metal oxides, and combinations thereof.

The light absorption metal layer may have an extinction coefficient from about 1.5 to about 3 in a visible light range.

The light absorption metal layer may include at least one selected from the group consisting of Ni, Cr, alloys of Ni and Cr, Ti, and combinations thereof.

The dielectric layer may include at least one selected from the group consisting of metal oxides, metal nitrides and combinations thereof, or may include the at least one doped with at least one element selected from the group consisting of bismuth (Bi), boron (B), aluminum (Al), silicon (Si), magnesium (Mg), antimony (Sb), beryllium (Be), and combinations thereof.

The dielectric layer may include at least one selected from the group consisting of titanium oxide, zinc tin oxide, zinc oxide, zinc aluminum oxide, tin oxide, bismuth oxide, silicon nitride, silicon aluminum nitride, and combinations thereof.

The substrate may be a transparent substrate having a visible light transmittance of about 90% to about 100%.

The substrate may be a glass or transparent plastic substrate.

The low-emissivity electroconductive layer may have a thickness of about 10 nm to about 25 nm.

The light absorption metal layer may have a thickness of about 5 nm to about 25 nm.

The dielectric layer may have a thickness of about 5 nm to about 50 nm.

The coating layer may further include at least one dielectric layer on one outermost surface thereof or on both outermost surfaces thereof.

The low-emissivity transparent laminate may include a first dielectric layer interposed between the substrate and the low-emissivity electroconductive layer; a second dielectric layer formed as the dielectric layer; and a third dielectric layer located above the light absorption metal layer opposite to the second dielectric layer.

In accordance with another aspect of the present invention, a building material includes the low-emissivity transparent laminate as set forth above.

In accordance with a further aspect of the present invention, a method for manufacturing a low-emissivity transparent laminate includes: forming a low-emissivity electroconductive layer by depositing a low-emissivity electroconductive metal or metal oxide onto a substrate; forming a dielectric layer on an upper surface of the low-emissivity electroconductive layer; and forming a light absorption metal layer by depositing a light absorbing metal onto an upper surface of the dielectric layer.

Advantageous Effects

The low-emissivity transparent laminate can simultaneously realize good visibility and privacy protection due to high visible light reflectance of an outer surface thereof and low visible light reflectance of an inner surface thereof while securing thermal insulation properties.

BEST MODE

Figure 1:
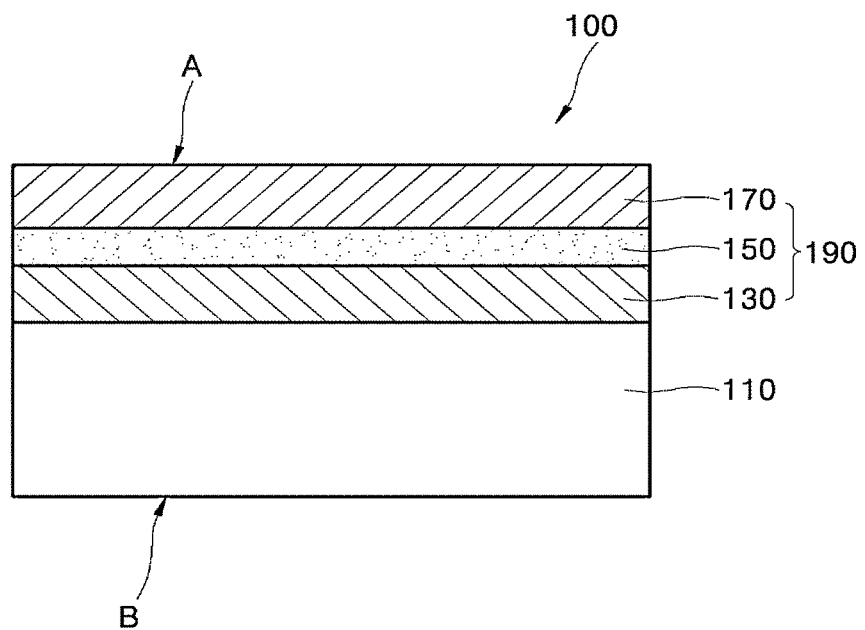
FIG. 1 is a schematic sectional view of a low-emissivity transparent laminate according to one embodiment of the present invention.

Hereinafter, embodiments of the present invention will be described in detail with reference to the accompanying drawings. It should be understood that the following embodiments may be embodied in different ways and are not to be in any way construed as limiting the present invention.

In the drawings, portions irrelevant to the description are omitted for clarity. Like components will be denoted by like reference numerals throughout the specification.

In the drawings, thicknesses of several layers and regions are enlarged for clarity. In addition, thicknesses of some layers and regions are exaggerated for convenience.

It will be understood that when an element such as a layer, film, region or substrate is referred to as being placed "on" (or under or below) another element, it can be directly placed on (or under or below) the other element, or intervening layer(s) may also be present.

Hereinafter, a low-emissivity transparent laminate according to one embodiment of the invention will be described in detail with reference to FIG. 1.

FIG. 1 is a sectional view of a low-emissivity transparent laminate 100 according to one embodiment of the present invention, which includes a substrate 110 and a coating layer 190. The coating layer 190 has a multilayer structure that includes a low-emissivity electroconductive layer 130, a dielectric layer 150 and a light absorption metal layer 170 in a sequential order from the substrate 110.

The low-emissivity transparent laminate 100 may have a difference in visible light reflectance from about 30% to about 75% between one surface thereof (denoted by 'A' in FIG. 1) at a light absorption metal layer 170 side and the other surface thereof (denoted by 'B' in FIG. 1) at a substrate 110 side, which is opposite to the one surface thereof. For example, if the difference in visible light reflectance is in the range of about 50% to about 75%, when the low-emissivity transparent laminate 100 is placed such that the surface thereof at the glass substrate side faces an outdoor side, the low-emissivity transparent laminate 100 serves as one way mirror due to high reflectance thereof, and conversely, can maximize privacy protection since view toward the outside can be sufficiently secured due to low reflectance at an indoor side.

The coating layer 190 has a multilayer thin film structure based on the low-emissivity electroconductive layer 130 selectively reflecting far infrared rays of sunlight, and imparts thermal insulation properties due to low-emissivity (low-e) to the low-emissivity transparent laminate 100 by reducing emissivity. The low-emissivity transparent laminate 100 having such a structure is a functional material realizing energy saving effects for buildings by reflecting solar radiation in summer while preserving infrared rays generated from an indoor heater in winter.

The term "emissivity" as used herein refers to a ratio by which an object absorbs, transmits and reflects energy having any specific wavelength. That is, the term "emissivity" as used herein indicates a degree of absorption of infrared energy in an infrared wavelength range, and specifically refers to a ratio of absorbed infrared energy to applied infrared energy when far infrared rays, which correspond to a wavelength range from about 5 μm to about 50 μm and exhibit strong thermal action, are applied.

According to Kirchhoff's law, since infrared energy absorbed by a certain material is the same as energy radiated back from the material, absorptivity of the material is the same as emissivity thereof.

In addition, since infrared energy not absorbed by a material is reflected by a surface of the material, emissivity becomes lower with increasing reflectance of infrared energy. This relationship is represented by Formula: Emissivity=1−reflectance of infrared light.

Emissivity may be measured through various methods typically known in the art. For example, emissivity may be measured using an apparatus such as a Fourier transform infrared spectrometer (FT-IR) in accordance with KSL2514, without being limited thereto.

Absorptivity for far infrared rays exhibiting strong thermal action, that is, emissivity for far infrared rays, may have a very important meaning in measurement of a degree of thermal insulation.

As described above, since the low-emissivity transparent laminate 100 includes the coating layer 190 formed on the transparent substrate 110 such as a glass substrate and the like, the low-emissivity transparent laminate 100 can exhibit reduced emissivity while maintaining certain transmissivity in a visible light range, and thus can be used as an energy-saving functional material for buildings providing excellent thermal insulation.

The low-emissivity electroconductive layer 130 is formed of an electrically conductive material having low-emissivity, for example, metal, and has low sheet resistance, thereby securing low-emissivity. For example, the low-emissivity electroconductive layer 130 may have an emissivity from about 0.01 to about 0.3, specifically from about 0.01 to about 0.2, more specifically from about 0.01 to about 0.1, still more specifically from about 0.01 to about 0.08. Within this range, the low-emissivity transparent laminate 100 can exhibit appropriate properties in terms of both thermal insulation and visible light transmittance. The low-emissivity electroconductive layer 130 having an emissivity within this range may have a sheet resistance of about 0.78 Ω/sq to about 6.42 Ω/sq, as measured on a thin film specimen.

The low-emissivity electroconductive layer 130 serves to selectively transmit and reflect solar radiation. The low-emissivity electroconductive layer 130 may include at least one selected from the group consisting of Ag, Au, Cu, Al, Pt, ion-doped metal oxides, and combinations thereof, without being limited thereto. Examples of the ion-doped metal oxides include indium tin oxide (ITO), fluorine-doped tin oxide (FTO), Al-doped zinc oxide (AZO), gallium zinc oxide (GZO), and the like. In one embodiment, the low-emissivity electroconductive layer 130 may be silver (Ag), and thus, the low-emissivity transparent laminate 100 can realize high electrical conductivity, low absorptivity in the visible light range, excellent durability, and the like.

The low-emissivity electroconductive layer 130 may have a thickness of, for example, about 10 nm to about 25 nm. The low-emissivity electroconductive layer 130 having a thickness within this range is suitable to simultaneously realize low-emissivity and high visible light transmittance.

The light absorption metal layer 170 may be formed of a metal exhibiting excellent light absorption. Since the low-emissivity transparent laminate 100 includes the light absorption metal layer 170, the low-emissivity transparent laminate 100 can increase a difference in visible light reflectance between one surface thereof at a coating layer 190 side and the other surface thereof at a substrate 110 side.

In one embodiment, the light absorption metal layer 170 may have an extinction coefficient of 1.5 to 3 in the visible light range. Extinction coefficient is a value derived from an optical constant which an optical material has as an inherent property thereof, and the optical constant is represented by an expression, n−ik. Here, the real part n is an index of refraction, and the imaginary part k is an extinction coefficient (also referred to as absorption coefficient). The extinction coefficient is a function of wavelength (λ), and metal generally has an extinction coefficient of greater than 0. The extinction coefficient k and the absorption coefficient α are expressed by Formula: $\alpha=(4\pi k)/\lambda$. When the absorption coefficient is α and the thickness through which light passes is d, the intensity of light passing through the thickness d (I) is decreased according to Formula $I=I_0\exp(-\alpha d)$, as compared with the intensity of incident light (I0).

Since the light absorption metal layer 170 uses a metal having an extinction coefficient within the above range in the visible light range and thus absorbs a certain portion of visible light, the low-emissivity transparent laminate 100 has a difference in visible light reflectance between one surface (denoted by 'A' in FIG. 1) at a side on which the light absorption metal layer 170 is coated and the opposite surface thereto (denoted by 'B' in FIG. 1, the other surface of the low-emissivity transparent laminate 100 at the substrate 110 side).

Since the light absorption metal layer 170 has a decreasing visible light absorptivity with decreasing extinction coefficient thereof, the difference in reflectance between surface A and surface A is decreased, and since the light absorption metal layer 170 absorbs a larger amount of light as the extinction coefficient thereof becomes larger, there can be difficulty securing transparency due to a lowered visible light transmittance thereof. When the light absorption metal layer 170 has an extinction coefficient within the above range, the light absorption metal layer 170 can secure a predetermined level of visible light transmittance while securing a predetermined level or higher of difference in reflectance between surface A and surface B.

For example, the light absorption metal layer 170 may include at least one selected from the group consisting of Ni, Cr, alloys of Ni and Cr, Ti, and combinations thereof, without being limited thereto.

The light absorption metal layer 170 may have a thickness of, for example, about 5 nm to about 25 nm, specifically from about 15 nm to about 25 nm. Within this range, since the difference in reflectance between upper and lower surfaces of the low-emissivity transparent laminate, that is, a value of an expression [(reflectance of one surface thereof (A) at the substrate 110 side)−(reflectance of the other surface thereof (B) at the side at which the light absorption metal layer 170 is coated)] is 30% or more, the low-emissivity transparent laminate can realize sufficient privacy protection, allow view toward the outside to be secured by appropriately maintaining transmittance of the coated glass, and allow a reflective color of the one surface (A) at the substrate 110 side to be implemented as a user preferred color such as blue.

The dielectric layer 150 is stacked to be interposed between the low-emissivity electroconductive layer 130 and the light absorption metal layer 170. As such, since the low-emissivity electroconductive layer 130 and the light absorption metal layer 170 are separated from each other so as not to be successively disposed, the low-emissivity transparent laminate 100 can maximize the difference in visible light reflectance between the one surface thereof at the substrate 110 side and the other surface thereof at the light absorption metal layer 170 side. As such, since the one surface of the low-emissivity transparent laminate 100 functions as a mirror due to high reflectance thereof, the low-emissivity transparent laminate 100 can prevent the interior of a building from being observed from the outside, while securing good visibility at the other surface thereof due to low visible light reflectance of the other surface thereof. The low-emissivity transparent laminate 100 can realize privacy protection. Therefore, the low-emissivity transparent laminate 100 can be used as a building material useful for blocking view from the outside in a section requiring personal privacy protection and security, such as lower floors of a building.

The dielectric layer 150 may be formed of a dielectric material having an index of refraction from about 1.5 to about 2.3. Depending upon the index of refraction of the dielectric layer 150, the thickness of the dielectric layer 150 may be adjusted such that transmittance, reflectance, and transmissive and reflective colors of the dielectric layers can be realized to desired target levels. In addition, the dielectric layer 150 may be formed of a material having an extinction coefficient close to 0. An extinction coefficient of greater than 0 means that incident light is absorbed by the dielectric layer before reaching a light absorption metal layer, and is not advantageous by inhibiting transparency. Therefore, the dielectric layer 150 may have an extinction coefficient of less than 0.1 in the visible light range (wavelength range from about 380 nm to about 780 nm).

Since a metal used as the low-emissivity electroconductive layer 130 is likely to be oxidized, the dielectric layer 150 may serve as an anti-oxidation film for the low-emissivity electroconductive layer 130. In addition, the dielectric layer 150 also serves to increase visible light transmittance.

The dielectric layer 150 may include various metal oxides, metal nitrides, and the like. For example, the dielectric layer 150 may include at least one selected from the group consisting of titanium oxide, zinc tin oxide, zinc oxide, zinc aluminum oxide, tin oxide, bismuth oxide, silicon nitride, silicon aluminum nitride, and combinations thereof, without being limited thereto. The metal oxides and/or the metal nitrides may be doped with at least one element selected from the group consisting of bismuth (Bi), boron (B), aluminum (Al), silicon (Si), magnesium (Mg), antimony (Sb), beryllium (Be), and combinations thereof.

The optical properties of the low-emissivity transparent laminate 100 may be adjusted by suitably adjusting materials and properties of the dielectric layer 150. In addition, the dielectric layer 150 may be composed of a plurality of layers.

The dielectric layer 150 may have a thickness of, for example, about 5 nm to about 50 nm. The thickness of the dielectric layer 150 may be variously adjusted depending upon the location and material of the dielectric layer so as to realize optical properties (transmittance, reflectance, color index) of the overall multilayer thin film satisfying target properties. Within the above thickness range, the dielectric layer 150 enables effectively control of optical properties of the multilayer thin film and can provide an advantage in terms of production rate.

The substrate 110 may be a transparent substrate having high transmittance of visible light, for example, a glass or transparent plastic substrate having a visible light transmittance of about 90% to about 100%. For example, the substrate 110 may be any glass used for construction, and may have a thickness of, for example, about 2 mm to about 12 mm depending upon application.

The low-emissivity transparent laminate 100 may be formed to have transmittance and reflectance corresponding to wavelength ranges of light by adjusting a material and thickness of each of the layers included in the coating layer 190, thereby realizing an optical spectrum suitable for usage. For example, although the low-emissivity transparent laminate 100 having high visible light transmittance can secure comfortable view, there is a problem of invasion of personal privacy by view from the outside due to low visible light reflectance. Conversely, the low-emissivity transparent laminate 100 having high visible light reflectance can block view from the outside, but has a disadvantage in acting as a transparent glass window due to insufficient visibility from an indoor side to an outdoor side.

The low-emissivity transparent laminate 100 allows fine control of optical properties such as color, reflectance, transmittance and the like of a highly reflective surface thereof, which is seen from the outside, by adjusting the material and thickness of each of the layers included in the coating layer 190.

The coating layer 190 may further include other intervening layers in addition to the aforementioned structure in order to realize desired optical properties, as described above. In one embodiment, the coating layer 190 may further include at least one dielectric layer on one outermost surface or on both outermost surfaces thereof.

Details of the additional dielectric layer, which may be further included in the coating layer 190, are as described above in relation to the dielectric layer 150.

Figure 2:
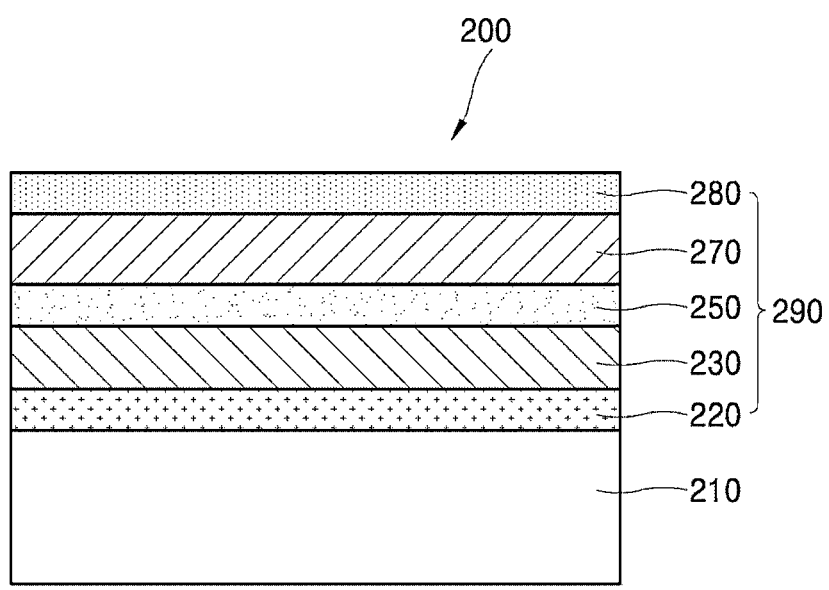
FIG. 2 is a schematic sectional view of a low-emissivity transparent laminate according to another embodiment of the present invention.

FIG. 2 is a sectional view of a low-emissivity transparent laminate 200 including a substrate 210 and a coating layer 290 according to another embodiment of the present invention. The coating layer 290 has a multilayer structure, which includes a first dielectric layer 220, a low-emissivity electroconductive layer 230, a second dielectric layer 250, a light absorption metal layer 270 and a third dielectric layer 280 in a sequential order above the substrate 210.

In accordance with another aspect of the present invention, a building material includes the low-emissivity transparent laminate as set forth above. Since the building material uses the low-emissivity transparent laminate, the building material can simultaneously realize visibility and privacy protection due to high visible light reflectance of an outer surface thereof and low visible light reflectance of an inner surface thereof while securing thermal insulation properties due to low-e, as described above.

In accordance with a further aspect of the present invention, a method for manufacturing a low-emissivity transparent laminate includes: forming a low-emissivity electroconductive layer by depositing a low-emissivity electroconductive metal or metal oxide onto a substrate; forming a dielectric layer on an upper surface of the low-emissivity electroconductive layer; and forming a light absorption metal layer by depositing a light absorbing metal onto an upper surface of the dielectric layer.

The low-emissivity transparent laminates 100, 200 may be manufactured by the method for manufacturing a low-emissivity transparent laminate.

In the method for manufacturing a low-emissivity transparent laminate, details of the low-emissivity electroconductive layer, the dielectric layer and the light absorption metal layer are the same as described above.

Deposition may be performed by any method known in the art without limitation.

The dielectric layer may also be formed by any method known in the art, for example, by deposition. For example, the dielectric layer may be formed by deposition using a magnetron sputter.

Next, the present invention will be described in more detail with reference to some examples. It should be understood that these examples are provided for illustration only and are not to be in any way construed as limiting the present invention.

EXAMPLES

Example 1

A multilayer-structured low-emissivity transparent laminate having a composition and thickness as listed in Table 1 was manufactured using a magnetron (C-Mag) sputter (Cetus-S, Selcos Co., Ltd.).

First, a 37.0 nm thick $TiO_2$ thin film was deposited onto a 6 mm thick transparent glass substrate using a $TiO_2$ ceramic as a target material and using a radio frequency power device. As a processing gas, argon was supplied at a flow rate of 100 sccm and pressure was maintained at 3 mTorr. A power of 1.5 kW was applied. Next, a 6.4 nm thick $ZnAlO_x$ layer was deposited using an oxide of a 10 wt % aluminum-containing zinc-based alloy as a target material under conditions of a radio frequency power of 1.2 kW, an argon flow rate of 100 sccm, and a pressure of 3 mTorr. Next, a 14.0 nm thick Ag thin film was deposited using Ag metal as a target material under conditions of a direct current power of 0.5 kW, an argon flow rate of 100 sccm, and a pressure of 3 mTorr. A 13.1 nm thick $ZnAlO_x$ layer was deposited onto an upper surface of the Ag thin film in the same manner as in the above $ZnAlO_x$ layer. Next, a 35.2 nm thick $SnZnO_x$ layer was deposited using a 50 wt % Sn-50 wt % Zn alloy as a target material through reaction during sputtering under conditions of a radio frequency power of 1 kW, an argon flow rate of 30 sccm, and an oxygen flow rate of 30 sccm while a pressure was maintained at 3 mTorr. A 6.0 nm thick NiCr thin film was deposited onto an upper surface of the $SnZnO_x$ layer using a 80 wt % Ni-20 wt % Cr alloy as a target material under conditions of a direct current power of 0.5 kW, an argon flow rate of 100 sccm and a pressure of 5 mTorr. A 44.5 nm thick $SnZnO_x$ layer was deposited again onto an upper surface of the NiCr thin film in the same manner as in the $SnZnO_x$ layer.

Thus, the low-emissivity transparent laminate, in which a coating layer having components and thicknesses as listed in Table 1 was formed on the glass substrate, was manufactured.

Examples 2 to 6

Low-emissivity transparent laminates, in which coating layers having components and thicknesses as listed in Table 1 were formed on glass substrates, were manufactured as in Example 1 except that the NiCr thin film was deposited to thicknesses of 9.0 nm, 12.0 nm, 15.0 nm, 18.0 nm and 21.0 nm in Examples 2 to 6, respectively.

Example 7

In the same manner as in Example 1, a 32.0 nm thick $TiO_2$ thin film, a 5.2 nm thick $ZnAlO_x$ layer, a 21.3 nm thick Ag thin film, a 5.0 nm thick $ZnAlO_x$ layer, a 32.0 nm thick $SnZnO_x$ layer, a 21.6 nm thick NiCr thin film, and a 41.7 nm thick $SnZnO_x$ layer were sequentially deposited onto a 6 mm thick transparent glass substrate, thereby manufacturing a low-emissivity transparent laminate, in which a coating layer having components and thicknesses as listed in Table 1 was formed on the glass substrate.

Comparative Example 1

In the same manner as in Example 1, a 37.0 nm thick $TiO_2$ thin film, a 6.4 nm thick $ZnAlO_x$ layer, a 14.0 nm thick Ag thin film, a 13.1 nm thick $ZnAlO_x$ layer, and a 79.7 nm thick $SnZnO_x$ layer were sequentially deposited onto a 6 mm thick transparent glass substrate, thereby manufacturing a low-emissivity transparent laminate, in which a coating layer having components and thicknesses as listed in Table 1 was formed on the glass substrate.

Comparative Example 2

In the same manner as in Example 1, a 37.0 nm thick $TiO_2$ thin film, a 6.4 nm thick $ZnAlO_x$ layer, a 14.0 nm thick Ag thin film, a 15.0 nm thick NiCr thin film, and a 44.5 nm thick $SnZnO_x$ layer were sequentially deposited onto a 6 mm thick transparent glass substrate, thereby manufacturing a low-emissivity transparent laminate, in which a coating layer having components and thicknesses as listed in Table 1 was formed on the glass substrate.

Comparative Example 3

In the same manner as in Example 1, a 37.0 nm thick $TiO_2$ thin film, a 19.5 nm thick $ZnAlO_x$ layer, a 35.2 nm thick $SnZnO_x$ layer, a 15.0 nm thick NiCr thin film, and a 44.5 nm thick $SnZnO_x$ layer were sequentially deposited onto a 6 mm thick transparent glass substrate, thereby manufacturing a low-emissivity transparent laminate, in which a coating layer having components and thicknesses as listed in Table 1 was formed on the glass substrate.

Evaluation of Properties

The low-emissivity transparent laminates manufactured in Examples 1 to 7 and Comparative Examples 1 to 3 were evaluated as to the following properties.

<Transmittance and Reflectance>

Using a UV-Vis-NIR spectrometer (Solidspec-3700, Shimadzu Co., Ltd.), an optical spectrum was measured at intervals of 1 nm in a range from 250 nm to 2500 nm, followed by calculating visible light transmittance, reflectance on a surface at a coating layer side of the low-emissivity transparent laminate, and reflectance on a surface at a glass substrate side thereof using measurement results in accordance with KS L 2514.

Figure 3:
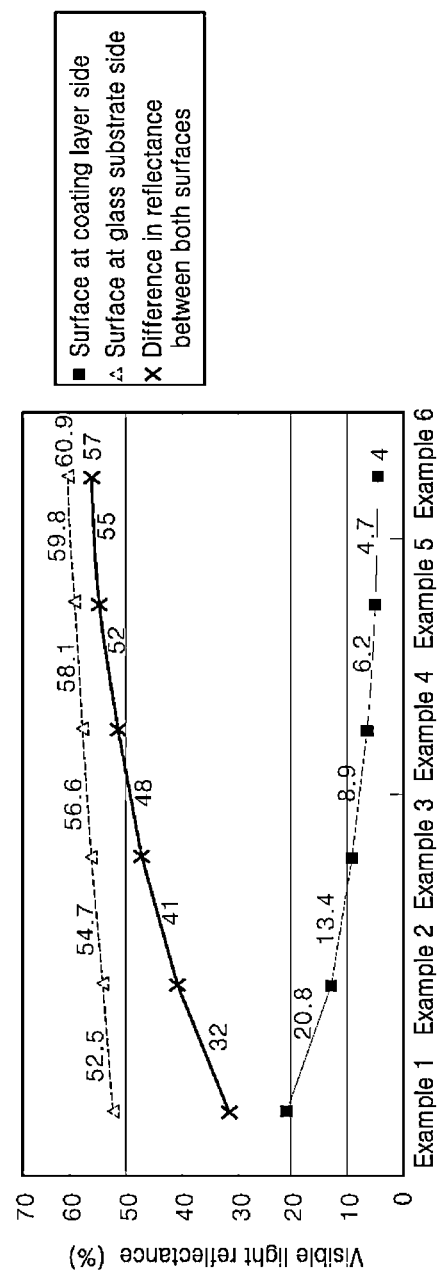
FIG. 3 shows results of reflectance of low-emissivity transparent laminates of Examples 1 to 7 as measured on both surfaces thereof.

FIG. 3 shows results of visible light reflectance of low-emissivity transparent laminates of Examples 1 to 6 as measured on both surfaces thereof.

<Emissivity>

Using an FT-IR spectrometer (Frontier, Perkin Elmer Co., Ltd.), a far infrared reflectance spectrum on one surface of a low-emissivity transparent laminate at a side on which a light absorption metal layer was coated was measured, followed by calculation of an average reflectance from measurement results in accordance with KS 2514. Then, emissivity was evaluated according to Formula: 100%−(average far infrared reflectance).

<Color Index>

Using a colorimeter (CM-700d, KONICA MINOLTA SENSING, Inc.), values of L*, a*, and b* were measured in accordance with CIE1931. Here, a KS illuminant D65 was used as a light source.

From results of Examples 1 to 6, it can be seen that, as the thickness of the NiCr layer was increased, visible light reflectance was slowly increased and reflectance on the surface at the coating layer side was more rapidly reduced, thereby increasing a difference in reflectance between the surface at the glass substrate side and the surface at the coating layer side. However, since the transmittance of the coated glass is reduced with increasing thickness of the NiCr layer, view toward the outside can be darkened. Even in this case, it can be confirmed that the NiCr layers of Examples 1 to 6 had an appropriate thickness.

Measurement results of optical properties of the low-emissivity transparent laminates of Examples 4 and 7 and Comparative Examples 1 to 3 are shown in Table 2.

TABLE 1

| | Multilayer structure (Film thickness, nm) |
|---|---|
| Example 1 | Glass substrate/$TiO_2$(37.0)/$ZnAlO_x$(6.4)/Ag(14.0)/$ZnAlO_x$(13.1)/$SnZnO_x$(35.2)/NiCr(6.0)/$SnZnO_x$(44.5) |
| Example 2 | Glass substrate/$TiO_2$(37.0)/$ZnAlO_x$(6.4)/Ag(14.0)/$ZnAlO_x$(13.1)/$SnZnO_x$(35.2)/NiCr(9.0)/$SnZnO_x$(44.5) |
| Example 3 | Glass substrate/$TiO_2$(37.0)/$ZnAlO_x$(6.4)/Ag(14.0)/$ZnAlO_x$(13.1)/$SnZnO_x$(35.2)/NiCr(12.0)/$SnZnO_x$(44.5) |
| Example 4 | Glass substrate/$TiO_2$(37.0)/$ZnAlO_x$(6.4)/Ag(14.0)/$ZnAlO_x$(13.1)/$SnZnO_x$(35.2)/NiCr(15.0)/$SnZnO_x$(44.5) |
| Example 5 | Glass substrate/$TiO_2$(37.0)/$ZnAlO_x$(6.4)/Ag(14.0)/$ZnAlO_x$(13.1)/$SnZnO_x$(35.2)/NiCr(18.0)/$SnZnO_x$(44.5) |
| Example 6 | Glass substrate/$TiO_2$(37.0)/$ZnAlO_x$(6.4)/Ag(14.0)/$ZnAlO_x$(13.1)/$SnZnO_x$(35.2)/NiCr(21.0)/$SnZnO_x$(44.5) |
| Example 7 | Glass substrate/$TiO_2$(32.0)/$ZnAlO_x$(5.2)/Ag(21.3)/$ZnAlO_x$(5.0)/$SnZnO_x$(32.0)/NiCr(21.6)/$SnZnO_x$(41.7) |
| Comparative Example 1 | Glass substrate/$TiO_2$(37.0)/$ZnAlO_x$(6.4)/Ag(14.0)/$ZnAlO_x$(13.1)/$SnZnO_x$(79.7) |
| Comparative Example 2 | Glass substrate/$TiO_2$(37.0)/$ZnAlO_x$(6.4)/Ag(14.0)/NiCr(15.0)/$SnZnO_x$(44.5) |
| Comparative Example 3 | Glass substrate/$TiO_2$(37.0)/$ZnAlO_x$(19.5)/$SnZnO_x$(35.2)/NiCr(15.0)/$SnZnO_x$(44.5) |

TABLE 2

| Evaluation item | | Example 4 | Example 7 | Comparative Example 1 | Comparative Example 2 | Comparative Example 3 |
|---|---|---|---|---|---|---|
| Transmittance | | 18.1% | 7.5% | 42.3% | 33.6% | 37.1% |
| Reflectance | Surface at coating layer side | 6.2% | 3% | 51.4% | 5.3% | 2.6% |
| | Surface at glass substrate side | 58.1% | 72.1% | 48.9% | 34.5% | 31.8% |
| | Surface at glass substrate side - Surface at coating layer side | 52% | 69% | −2.5% | 29.2% | 29.2% |
| Transmissive color | L* | 49.62 | 32.97 | 66.64 | 64.63 | 67.33 |
| | a* | −1.94 | −3.46 | 0.35 | −7.31 | 0.26 |
| | b* | −4.23 | −7.55 | 11.62 | 8.41 | 6.94 |
| Coated reflective color | L* | 29.9 | 19.97 | 80.51 | 27.47 | 18.36 |
| | a* | −1.95 | 6.62 | −2.47 | 23.36 | 26.73 |
| | b* | −6.79 | 2.16 | −7.97 | −22.27 | −7.71 |
| Reflective color of surface at glass substrate side | L* | 80.8 | 87.99 | 78.81 | 65.35 | 63.16 |
| | a* | −3.12 | −2.13 | −3.87 | 3.28 | −10.32 |
| | b* | −0.06 | 4.18 | −6.64 | −17.86 | −20.29 |
| Emissivity | | 3.14% | 2.25% | 2.28% | 2.73% | 86.72% |

The low-emissivity transparent laminate of Example 4 had a transmittance of 18.1%, and all of the transmissive color, the reflective color at the coating layer side, and the reflective color at the glass substrate side had color indices a* and b* between 0 and −10 and thus provided pale blue in neutral colors, the low-emissivity transparent laminate of Example 4 realized a comfortable color for view of users. Generally, when a color of a low-emissivity transparent laminate is red and purple, the color falls within non-preferred colors of users. The low-emissivity transparent laminate of Example 4 also had a far infrared emissivity of 3.14%, and thus secured better thermal insulation properties than general low-e coated glasses.

The low-emissivity transparent laminate of Example 7 had a difference in reflectance of up to 69% between the surface at the glass substrate side and the surface at the coating layer side.

The low-emissivity transparent laminate of Comparative Example 1 did not include NiCr corresponding to the light absorption metal layer. In this case, since the visible light reflectance of the surface at the coating layer side was increased to 51.4% and the visible light reflectance of the surface at the glass substrate side was decreased to 48.9%, the low-emissivity transparent laminate of Comparative Example 1 provided extremely poor effects of securing privacy through a difference in reflectance.

The low-emissivity transparent laminate of Comparative Example 2 did not include a dielectric layer between the silver layer and the NiCr layer. In this case, although the difference in reflectance between the surface at the coating layer side and the surface at the glass substrate side was secured to a level of 29%, since the reflective color of the surface at the coating layer side had color indices a*=23.36 and b*=−22.21 and thus provide dark purple, there was a problem in that the low-emissivity transparent laminate of Comparative Example 2 exhibited a non-preferred color to indoor users.

The low-emissivity transparent laminate of Comparative Example 3 did not include a silver layer corresponding to the low-emissivity electroconductive layer. In this case, although the difference in reflectance between the surface at the coating layer side and the surface at the glass substrate side was secured to a level of 29%, since the emissivity of the surface at the coating layer side was 86.7% and thus was the same as that of the non-coated surface at the general glass substrate side, the low-emissivity transparent laminate of Comparative Example 3 did not secure thermal insulation properties as a low-emissivity transparent laminate having low-e effects.

LIST OF REFERENCE NUMERALS

100, 200: low-emissivity transparent laminate
110, 210: substrate
130, 230: low-emissivity electroconductive layer
150, 220, 250, 280: dielectric layer
170, 270: light absorption metal layer
190, 290: coating layer

The invention claimed is:

1. A low-emissivity transparent laminate comprising:
a substrate; and
a coating layer,
wherein the coating layer has a multilayer structure comprising a first dielectric layer, a low-emissivity electroconductive layer, a second dielectric layer, a light absorption metal layer, and a third dielectric layer in a sequential order from the substrate;
wherein the low-emissivity transparent laminate has a difference in visible light reflectance from 50% to 75% between one surface thereof at a substrate side and the other surface thereof at a light absorption metal layer side;
wherein the light absorption metal layer has a thickness from 15 nm to 25 nm,
wherein the low-emissivity electroconductive layer is Ag,
wherein the light absorption metal layer is, alloys of Ni and Cr,
wherein the first dielectric layer and the third dielectric layer comprises at least one selected from the group consisting of titanium oxide, zinc tin oxide, zinc oxide, zinc aluminum oxide, tin oxide, bismuth oxide, silicon nitride, silicon aluminum nitride, and combinations thereof,
wherein the second dielectric layer is zinc aluminum oxide,
wherein the substrate is a transparent substrate having a visible light transmittance from 90% to 100%,
wherein the first dielectric layer and the third dielectric layer are both outermost surfaces of the coating layer.

2. The low-emissivity transparent laminate according to claim 1, wherein the low-emissivity electroconductive layer has an emissivity from 0.01 to 0.3.

3. The low-emissivity transparent laminate according to claim 1, wherein the low-emissivity electroconductive layer comprises a metal having a sheet resistance from 0.78 Ω/sq to 6.42 Ω/sq.

4. The low-emissivity transparent laminate according to claim 1, wherein the light absorption metal layer has an extinction coefficient from 1.5 to 3 in a visible light range.

5. The low-emissivity transparent laminate according to claim 1, wherein the substrate is a glass or transparent plastic substrate.

6. The low-emissivity transparent laminate according to claim 1, wherein the low-emissivity electroconductive layer has a thickness from 10 nm to 25 nm.

7. The low-emissivity transparent laminate according to claim 1, wherein the first dielectric layer, the second dielectric layer, and the third dielectric layer each have a thickness from 5 nm to 50 nm.

8. The low-emissivity transparent laminate according to claim 1, wherein the light absorption layer is NiCr, the first and third dielectric layers are zinc aluminum oxide, and the low-emissivity electroconductive layer is Ag.

9. A building material comprising the low-emissivity transparent laminate according to claim 1.

* * * * *